Sept. 20, 1955  E. C. WEISKOPF  2,718,582
ELECTRICALLY HEATED IMPLEMENT
Filed Feb. 7, 1951
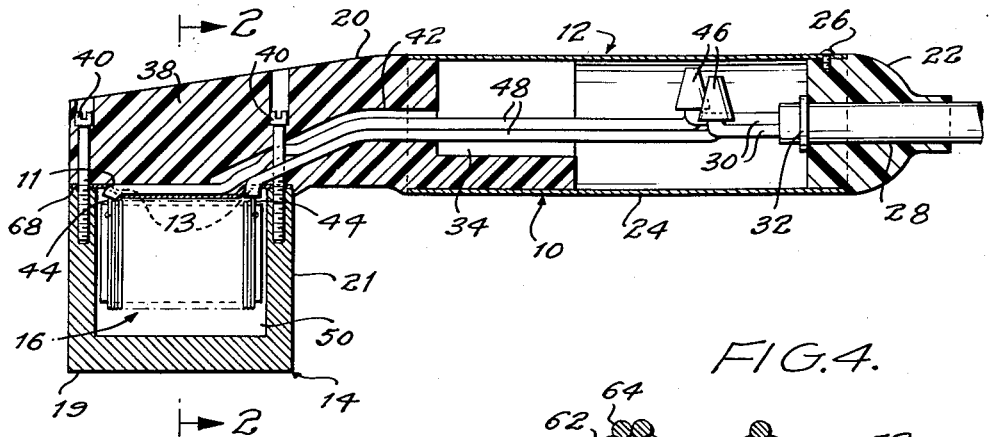
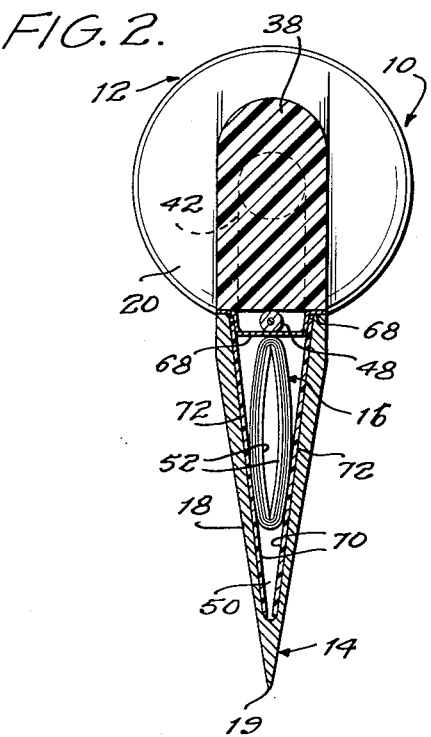
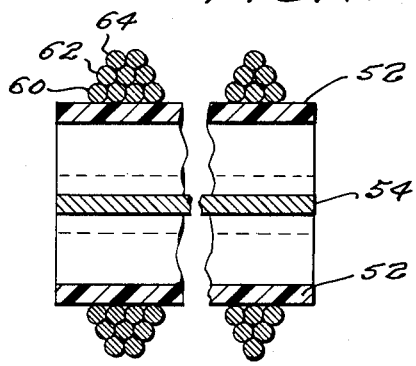
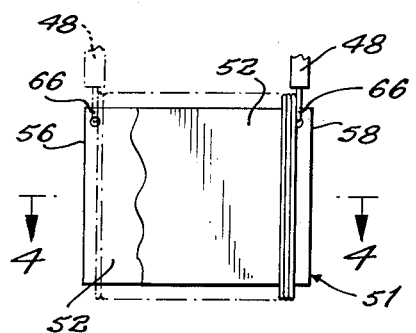
INVENTOR.
EDWIN C. WEISKOPF
BY
ATTORNEYS

United States Patent Office 2,718,582
Patented Sept. 20, 1955

2,718,582

ELECTRICALLY HEATED IMPLEMENT

Edwin C. Weiskopf, New York, N. Y., assignor to Technicon International, Ltd., New York, N. Y., a corporation of New York Application February 7, 1951, Serial No. 209,784

2 Claims. (Cl. 219—21)

This invention relates to an electrically heated implement or tool and an electric heating element therefor.

One object of this invention is the provision of an electrical heating implement or tool of improved construction and operation to facilitate the cutting and trimming of paraffin blocks, particularly in a laboratory by the pathological, histological or biological technician.

Another object of this invention is the provision of an improved heating element in an electrically heated tool which is inherently highly resistant to electrical breakdown.

Another object of this invention is the provision of an improved heating element which is of simple construction, high heating capacity, and which is extremely compact.

Another object of this invention is the provison of an electrically heated tool with improved sealing means between the parts to inhibit the entrance of foreign matter into the parts.

Yet another object of this invention is the provision of an electrically heated tool in which the electric wires disposed therein are protected to a very high degree against mechanical and electrical breakdown.

Other objects, features and advantages of the invention will become apparent as the description thereof proceeds when considered in connection with the accompanying illustrative drawings in which:

Fig. 1 is a longitudinal sectional view of the electrically heated tool embodying the present invention;

Fig. 2 is a sectional view taken on the line 2—2 of Fig. 1;

Fig. 3 is a front elevational view of the electrical heating element of the present invention; and Fig. 4 is a sectional view taken on the line 4—4 of Fig. 3.

Referring now to the drawings in detail, the tool or implement 10 embodying the present invention comprises a handle 12, a blade or knife 14, and a heating resistance unit or element 16. The handle comprises, as here shown, separate portions 20 and 22 formed of thermal and electrical insulation material, for example, but without limitation, wood or "Bakelite," and joined by a tubular section or member 24, preferably formed of stainless steel, or the like, and secured thereto by any suitable means, for example, rivets 26. Handle portion 22 is provided with a central passageway 28 through which electric wires 30 enter the handle, an antifraying member 32 being provided for said wires on the inside of handle part 22. Handle part 20 is provided with a recessed portion or seat 34 and an axial passageway 42 extending to recess 34 from the opening 11 in said handle part. Handle part 20 is also provided with an axially extending preferably tapered shank 38 to which blade 14 is secured by any suitable means, for example screws 40 countersunk in shank 38. Passageway 42 extends through the shank 38 to the blade 14 for the passage of electrical wires 44 through the handle 12 to the heating element 16. With reference to Fig. 1, it will be seen that electric wires 44 extend from heating element 16 through the passageway 42, and through recess 34, the wires 44 being connected to the wires 30 by means of conventional connector elements 46. Blade 14 is preferably formed of berryllium copper but may be made of any other suitable thermal conducting material and is provided with an internal seat or recess 50 in which the heating element 16 is disposed.

The heating element 16 has a core or bobbin 51 formed of a pair of mica or other suitable insulating plates 52 which are outwardly bowed, as best shown in Fig. 2. In forming the bobbin 51, a copper, or other suitable, forming member 54 (Fig. 4) is positioned between the mica plates 52 during the winding operation of the heating element. It will be understood that forming member 54 is only used in the formation of a bobbin 51 during the winding operation, and on the completion of the winding operation the forming member 54 is removed and forms no part of the apparatus as finally assembled for use. In accordance with the present invention, the windings are started in the region of one of the ends of the bobbin 51, for example, end 56, and the windings are wound around the bobbin 51 to the other end 58 of the bobbin 51. In order to provide the desired operating temperature of blade 14 for melting paraffin, the heater winding comprises a plurality of layers, here shown as three superimposed adjacent layers 60, 62 and 64. The adjacent layers 60, 62 and 64 are wound in opposing directions on the bobbin 51, the windings of the layers 62 and 64 starting at the same end of the bobbin as the terminus of the windings of the layer next below, for a purpose which will be fully brought out hereinafter. It will be seen that layer 60 starts at end 56 of the bobbin 51 and has its terminus at end 58, the layer 62 starting at the terminus of the layer 60 at end 58. Layer 62 will have its terminus at end 56 and layer 64 will start at the extremity or end 56 of the bobbin 51, and will have its terminus at end 58 whereby the terminals 66 of the windings will be positioned at the opposite extremities or ends of the heating element 16.

In the winding of the heating element, the mica insulating plates 52 are initially bowed outwardly, and in the completed heating element are retained in this position by the windings. It will be noted that the superposed layers of windings 60, 62 and 64 are continuous and the convolutions thereof are uniformly spaced on the bobbin 51. Although the concept of this invention has been illustrated with three superposed layers of windings, it will be manifest to those skilled in the art, in view of the present disclosure, that any plural odd number of layers can be used to obtain the desired objectives. The provision of a plural odd number of superposed layers of windings wound on the bobbin 51 in the aforedescribed manner results in the positioning of the terminals of the windings at the extremities of the heating element 16. It will be evident that if an even number of superposed layers of windings were wound on the bobbin with each of the adjacent layers being wound in opposing directions, the end terminals of the windings would be closly spaced at one of the extremities or ends of the bobbin. The windings of the heating element of the present invention therefore provide for the terminals of the windings to be positioned at the extremities of the heating element where a plurality of superposed layers of windings are used. Although the bowed bobbin 51 has been described with reference to mica insulating plates 52, it will be evident that the insulating plates 52 may be of any other suitable insulating material.

Blade 14 is provided with the converging sides or flat-planar surfaces 18 which provide relatively large heat dissipating surfaces and which meet in a relatively sharp cutting edge 19. T sllsnitatehuba2l cutting edge 19. The substantially triangular front and rear end blade walls 21 provide additional heat conducting surfaces of smaller dimensions for use where sides 18 are too large. The shank 38 of handle 12 has a portion which is adapted to engage the blade 14 at the top of the recess 50 and completely overlies and closes said recess. A thermo-setting adhesive coated gasket strip or packing 68 is interposed between the portion of the shank 38 which overlies the recess opening 50 and the blade opening 11 for sealing the opening to prevent the entrance of foreign matter into the recess 50. Said packing 68 is suitably apertured as at 13 (Fig. 1) for the passage therethrough of the electric wires 44 and the tubes 48 surrounding said wires. In practice, it has been found that paraffin has a seeping tendency into cracks and crevices by capillary action and gasket strip 68 is provided to obviate the undesirable results due to this inherent seeping tendency of molten paraffin. Although a thermo-setting adhesive coated gasket strip is used in the preferred embodiment of this invention, any suitable gasket strip may be used for the purpose of sealing the joint between blade 14 and handle shank 38 over recess 50 against wax penetration to eliminate one of the sources of electrical breakdown of the heating element. Long flexible insulation tubes 48 surround electric wires 44, said tubes extending from the heating element terminals 66, through the passageway 42, the recessed portion 34, to the connector elements 46. The heating element 16 is suitably positioned in the internal recess 50 of blade 14 and mica insulating plates 70 are disposed between said heating element and the internal mutually inclined walls 72 of the blade 14 which serve to hold the outwardly bowed heating element in position in the recess 50.

The bobbin 51, according to this invention, is outwardly bowed in order to avoid sharp edges and points of high stress concentration in the windings. It will be evident that the outwardly bowed bobbin provides for a material reduction in stress concentration of the windings, which has been a significant source of weakening of the windings with resultant mechanical and concomitant electrical breakdown. Another source of electrical breakdown has been the close positioning of the heating element terminals on the bobbin, and this invention provides for the disposition of the winding terminals at the extremities of the heating element where a plurality of superposed layers of windings are wound on the bobbin.

In order to have the terminals of the windings disposed at the extremities of the heating element where an even number of superposed layers of windings are used, it has been necessary to have each of the adjacent layers of windings wound in the same direction, with each layer terminus, above the layer adjacent to the bobbin, being longitudinally crossed over the bobbin so that the next layer will start at the same extremity of the bobbin as the layer next below.

It will therefore be seen that in accordance with this invention there is provided an improved heating element in an electrically heated tool which is inherently highly resistant to mechanical and electrical breakdown. It will be observed that the heating element is of simple construction, extremely compact and of high heat capacity, consistent with high resistance to electrical breakdown. It will also be seen that the electrically heated tool is provided with improved sealing means interposed between the handle and the blade for sealing the recess in which the heating element is positioned, thereby eliminating another source of electrical breakdown. The disposition of the electric wires in the long insulation tubes in the handle of the tool protects said wires to a very high degree against both mechanical and electrical breakdown.

While the implement may be put to numerous uses, it is especially advantageous by pathologists and others in trimming paraffin blocks, separating paraffin blocks from object disks, attaching blocks to object disks, cutting large blocks of paraffin, separating cut histological tissue sections or ribbons on water, making neat uniform blocks for filing purposes, and cutting blocks evenly and neatly when tissue is embedded en masse. The tool is also useful in any situation where it is desired to apply heat to an article, for example, for sealing specimens in museum jars, for melting wax or similar substances, etc. Numerous other uses for the tool of the above invention will become apparent to the technician in the laboratory.

Although the electric heating element of this invention has been described with reference to a particular tool or implement, it will be obvious that subject heating element may be used in other and diverse applications where a high capacity compact electrical heating source is required or desired.

This application is a continuation in part of my application, Ser. No. 96,526, filed January 1, 1949, now U. S. Patent 2,623,977 granted December 30, 1952.

While there is shown and described herein certain specific structure embodying the invention, it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

Having thus described my invention, what I claim and desire to secure by Letters Patent, is:

1. An electrically heated tool, comprising a metal heated member having a recess and a peripheral opening in communication with said recess, an electric heating element positioned in said recess, a handle secured to said heated member and having a part closing said opening, said handle having an axial passage for electric supply wires for connecting said heating element to a source of current, said passage having an opening defined in said handle part and in registry with said first mentioned opening, and said heating element having an odd number of substantially uniform superposed layers with adjacent winding layers wound in opposite directions so that the opposite ends of the complete winding are disposed in spaced relation axially of the heating element for electrical connection at spaced points relative to said peripheral opening, and electric supply wires in said passage of the handle extending through said openings and connected to said spaced ends of the heating element in said recess.

2. In an electrically heated tool, a blade provided with a recess formed therein, said blade having a longitudinally extending opening defined therein in communication with said recess, and an electric heating element positioned in said recess for heating said blade and being insertable in said recess through said opening, said heating element having outwardly bowed bobbin means retained by opposing wall surface portions of said recess for mounting said heating element in said blade, said bobbin means having a continuous heater winding having an odd number of superposed layers with adjacent winding layers wound in opposite directions so that the opposite ends of the complete winding are disposed in spaced relation axially of the heating element for electrical connection at spaced points of said opening, said blade having a cutting edge at the lower side thereof and said opening being longitudinal and defined in the upper side of said blade so that the ends of said winding are accessible at the opposite longitudinally spaced ends, respectively, of said opening.

References Cited in the file of this patent

UNITED STATES PATENTS

| | | |
|---|---|---|
| 549,152 | Pogue | Nov. 5, 1895 |
| 580,276 | Harrington | Apr. 6, 1897 |
| 617,067 | Williams | Jan. 3, 1899 |
| 795,747 | Wirt | July 25, 1905 |
| 956,004 | Savoy | May 3, 1910 |
| 1,477,631 | Deenihan | Dec. 18, 1923 |

(Other references on following page)

UNITED STATES PATENTS

| Number | Name | Date |
|---|---|---|
| 1,536,669 | Grant | May 5, 1925 |
| 1,658,884 | Cusick | Feb. 14, 1928 |
| 2,032,688 | Dart | Mar. 3, 1936 |
| 2,107,220 | Schulz | Feb. 1, 1938 |
| 2,110,985 | Jacobson | Mar. 15, 1938 |
| 2,206,994 | Zent | July 10, 1940 |
| 2,250,602 | Pierce | July 29, 1941 |
| 2,491,708 | Bradley | Dec. 20, 1949 |

FOREIGN PATENTS

| Number | Country | Date |
|---|---|---|
| 15,275 | Great Britain | July 1, 1912 |
| 505,821 | France | May 15, 1920 |
| 747,299 | France | Mar. 28, 1933 |